United States Patent
Blume et al.

[11] Patent Number: 5,951,171
[45] Date of Patent: Sep. 14, 1999

[54] SLIDE BEARING, PARTICULARLY FOR A GEAR PUMP

[75] Inventors: Peter Blume, Zürich; Gregor Seekirchner, Winterthur, both of Switzerland

[73] Assignee: Maag Pump Systems Textron AG, Zurich, Switzerland

[21] Appl. No.: 08/941,227

[22] Filed: Sep. 30, 1997

[30] Foreign Application Priority Data

Sep. 30, 1996 [EP] European Pat. Off. .............. 96115639

[51] Int. Cl.⁶ ...................................... F16C 33/10
[52] U.S. Cl. .......................................... 384/291; 384/286
[58] Field of Search .................... 384/286–292, 384/322, 397, 400, 100, 114, 118

[56] References Cited

U.S. PATENT DOCUMENTS

| | | | |
|---|---|---|---|
| 1,236,511 | 8/1917 | Waring | 384/291 |
| 2,891,483 | 6/1959 | Murrat et al. | 384/291 X |
| 3,604,770 | 9/1971 | Peltier et al. | 384/286 |
| 4,459,048 | 7/1984 | Stachuletz | 384/291 |
| 5,190,450 | 3/1993 | Ghosh et al. | 384/114 X |

FOREIGN PATENT DOCUMENTS

| | | |
|---|---|---|
| 620368A2 | 10/1994 | European Pat. Off. . |
| 832968 | 3/1952 | Germany . |
| 2005740 | 9/1970 | Germany . |
| 1275252 | 5/1972 | United Kingdom . |

*Primary Examiner*—Thomas R. Hannon
*Attorney, Agent, or Firm*—Evenson McKeown Edwards & Lenahan, PLL

[57] ABSTRACT

A slide bearing for a gear pump or the like has a lubrication groove provided in the surface of the cylinder forming the slide bearing. The lubrication groove is constructed to be ending flatly in the area of that edge which, with respect to the shaft rotating direction acts as an inlet edge into the slot between the slide bearing and the shaft. Thus, it is achieved that the slide bearing is sufficiently lubricated also by fluid which flows at a higher viscosity and has an unknown elastic performance.

32 Claims, 1 Drawing Sheet

SLIDE BEARING, PARTICULARLY FOR A GEAR PUMP

BACKGROUND AND SUMMARY OF THE INVENTION

This application claims the priority of European application 961 15 639.5 filed in the European Patent Office on Sep. 30, 1996, the disclosure of which is expressly incorporated by reference herein.

The present invention relates to a slide bearing having a lubrication groove as well as to a gear pump having a slide bearing of this type.

It is known that slide bearings for gear pumps are often lubricated by the delivered medium because it may be assumed that, because of the eccentricity of the shaft in the slide bearing, which results in an increased gap width on the no-load side of the slide bearing, and because of a differential pressure applied above the slide bearing, the admittance of the material to be conveyed into the slide bearing is ensured and the shaft guided in the slide bearing is therefore sufficiently lubricated.

For fluid flowing at a higher viscosity, the admittance to the slide bearing and the distribution over the width of the bearing can be facilitated by a lubrication groove, as described, for example, in European Patent Document EP-0 620 368.

Fluids with an unknown elastic behavior often have the disadvantage that the fluid pressure in the lubrication groove is insufficient for pulling the lubricating fluid, that is, the material to be conveyed, into the gap between the slide bearing and the shaft.

It is therefore an object of the present invention to provide a slide bearing in the case of which a sufficient lubrication is ensured, particularly also with respect to a fluid flowing at a higher viscosity.

This object is achieved according to preferred embodiments of the invention by providing a slide bearing wherein the lubrication groove is constructed to be ending flatly in an area of an edge which acts as an inlet edge into a slot between the slide bearing and the shaft with respect to the shaft rotating direction.

The invention has the following advantages: Because of the flat construction of the entry edge by way of which lubricating medium, that is, conveyed medium, arrives directly in the slot between the slide bearing and the shaft, the conveyed medium has enough time for sufficiently reducing the expansion tensions which occur because of the cross-sectional changes and the meeting of the continuity equation and thus reducing the elasticity-caused additional pressure requirement. Generally and particularly in the case of cellulose-containing conveyed mediums, this is an important advantage.

Other objects, advantages and novel features of the present invention will become apparent from the following detailed description of the invention when considered in conjunction with the accompanying drawings.

DETAILED DESCRIPTION OF THE DRAWINGS

Figure 1:
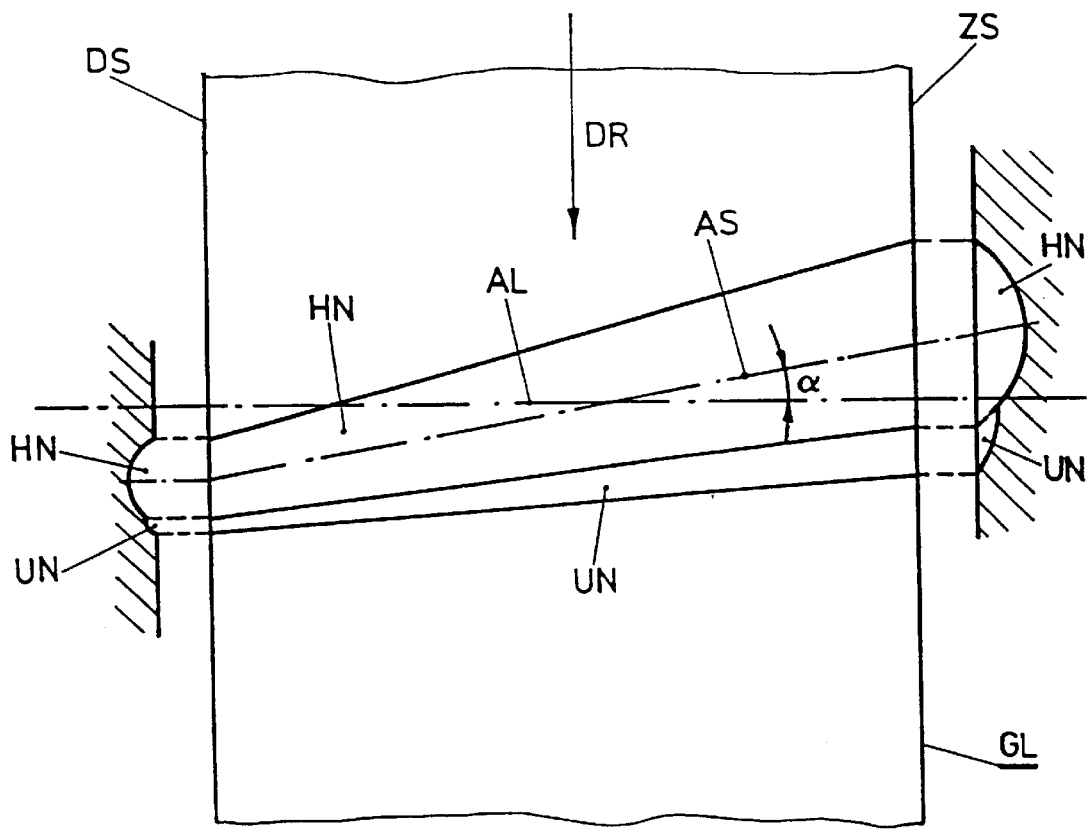
FIG. 1 is a developed view of a slide bearing according to the invention.

FIG. 1 illustrates a slide bearing GL according to the invention developed on a plane, in which case two lateral views of the slide bearing GL are shown. In the surface of the slide bearing GL, a recess in the form of a groove is constructed, particularly—as illustrated in FIG. 1—as a main groove HN and as a transition groove UN, the main groove HN and the transition groove UN being constructed to be extending in one another and the main groove HN being larger than the transition groove UN. In addition, the main groove HN and the transition groove UN have larger depth on the gear wheel side ZS than on the corresponding seal side DS and, as illustrated in FIG. 1, the transition from the maximal to the minimal depth takes place in a constant manner. Like the above-mentioned constant transition with respect to the groove depths, a constant transition with respect to the change of the groove widths takes place in the same manner. As a result, the cross-sectional surface formed by the main groove HN and the transition groove UN also changes constantly, specifically, the cross-sectional surface becomes constantly smaller starting from the gear wheel side ZS in the direction of the seal side DS.

As illustrated in FIG. 1 and indicated as a preferred embodiment of the invention, the axis AL of the slide bearing GL encloses an angle α together with the axis AS of the lubrication groove, that is, of the main groove and of the transition groove UN. This angle α is always selected to be smaller than 45°—preferably smaller than 30°. In this case, as illustrated in FIG. 1, the lubrication groove slope is aligned with respect to the slide bearing axis AL such that, viewed in the rotating direction of the shaft, the lubrication groove starts earlier on the gear wheel side ZS than on the seal side DS.

The groove depths of the main lubrication groove HN and of the transition groove UN may be constructed in a standard-type manner for fluid classes, such as polyolefines, or individually. A cross-sectional outlet surface is preferred which is clearly reduced with respect to the inlet cross-section in order to minimize the slide bearing leakage. It is also conceivable that, because of the fluid to be conveyed, the lubrication groove or at least a portion thereof, that is, the main groove HN and/or the transition groove UN, end in the slide bearing GL; that is, that the lubrication groove does not extend completely from the tooth side ZS to the seal side DS.

For a precise explanation of the preferred embodiment of the present invention, the lubrication groove was divided into a main groove HN and a transition groove UN. However, in reality, it is a single groove which preferably is constructed such that its entry edge into the slot between the slide bearing and the shaft is constructed flat with respect to the shaft rotating direction.

Figure 2:
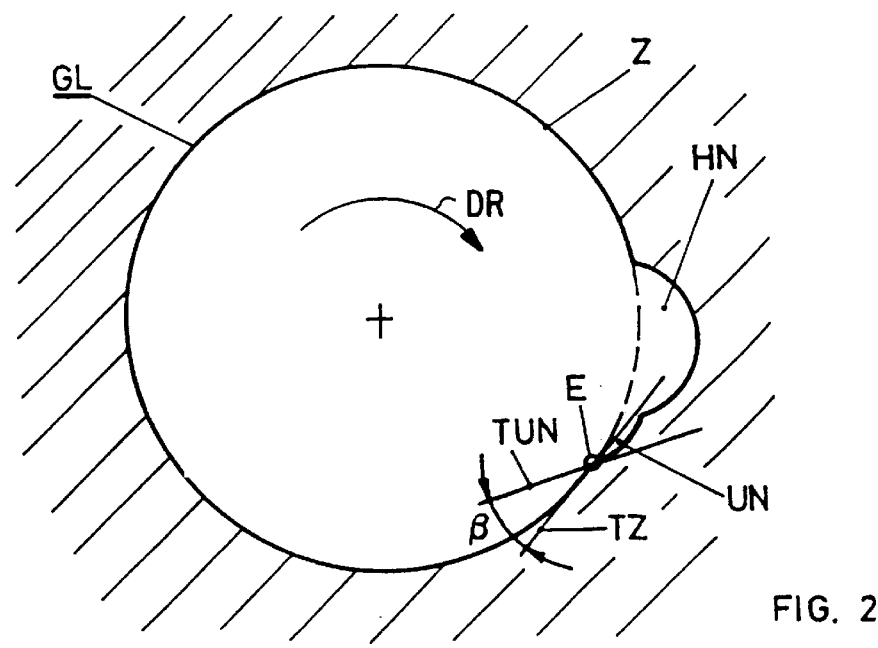
FIG. 2 is a sectional view of the bearing bore of the slide bearing according to the invention.

FIG. 2 is a cross-sectional view of the slide bearing GL according to the invention, in which case the main groove and the transition groove HN and UN shaped into a cylindrical jacket Z of the slide bearing GL are clearly recognizable. In this illustrated embodiment of the invention, the main groove HN and the transition groove UN are constructed to have the shape of a circular cylinder, which permits a simple arranging of the lubrication groove in the slide bearing GL. The mentioned flat design of the lubrication groove, in the case of the embodiment illustrated in FIG. 2, is, for example, achieved by the fact that a groove tangent TUN to the transition groove UN in a corner point E between the transition groove UN and the cylinder jacket Z together with a bore tangent TZ to the cylinder jacket Z in the mentioned corner point E encloses an angle β which is smaller than 30°, preferably smaller than 15° C. These angle indications relate to a cut through the gear-wheel-side ZS bearing end of the slide bearing GL, which is why the angle size for the angle β, particularly in the case of a decreasing cross-sectional surface of the lubrication groove in the direction of the seal side DS, along the slide bearing width toward the seal side DS also becomes smaller.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Slide bearing for a gear pump having a slide bearing jacket and a lubrication groove in said jacket, said lubricating groove extending from a gear pump wheel side toward a gear pump seal side with a lubricating groove axis extending at an angle α with respect to a slide bearing jacket axis, wherein the cross-sectional area of the lubrication groove decreases in a direction from the gear wheel side to the gear pump seal side, and wherein the lubrication groove has a flat ending in an area of an edge which acts as an inlet edge into a slot between the slide bearing and the shaft with respect to the shaft rotating direction.

2. Slide bearing according to claim 1, wherein the lubrication groove is provided essentially on a no-load side of the slide bearing.

3. Slide bearing according to claim 2, wherein the lubrication groove on the gear wheel side, viewed in the rotating direction, starts earlier than on the seal side.

4. Slide bearing according to claim 3, wherein the lubrication groove consists of a main groove and of a transition groove, the transition groove forming the flat ending at the inlet edge.

5. Slide bearing according to claim 3, wherein the cross-sectional area of the lubrication groove decreases constantly from the gear wheel side to the seal side.

6. Slide bearing according to claim 5, wherein an angle (α) situated between a slide bearing axis and a lubrication groove axis is smaller than 45°.

7. Slide bearing according to claim 5, wherein the lubrication groove consists of a main groove and of a transition groove, the transition groove forming the flat ending at the inlet edge.

8. Slide bearing according to claim 7, wherein the transition groove and the main groove have a circular cylindrical shape, and wherein a groove tangent to the transition groove in a corner point between the transition groove and the cylinder jacket of the slide bearing groove together with a bore tangent to the cylinder jacket in the corner point encloses an angle β which is smaller than 30°, at least on the gear wheel side.

9. Slide bearing according to claim 1, wherein the lubrication groove leads from the gear wheel side to the seal side.

10. Slide bearing according to claim 3, wherein the cross-sectional area of the lubrication groove decreases constantly from the gear wheel side to the seal side.

11. Slide bearing according to claim 9, wherein the lubrication groove consists of a main groove and of a transition groove, the transition groove forming the flat ending at the inlet edge.

12. Slide bearing according to claim 11, wherein the transition groove and the main groove have a circular cylindrical shape, and wherein a groove tangent to the transition groove in a corner point between the transition groove and the cylinder jacket of the slide bearing groove together with a bore tangent to the cylinder jacket in the corner point encloses an angle β which is smaller than 30°, at least on the gear wheel side.

13. Slide bearing according to claim 12, wherein said angle β is smaller than 15°.

14. Slide bearing according to claim 12, wherein the angle β decreases along the bearing width from the gear wheel side to the seal side.

15. Slide bearing according to claim 1, wherein the angle (α) situated between a slide bearing axis and a lubrication groove axis is smaller than 45°.

16. Slide bearing according to claim 15, wherein said angle (α) is 30°.

17. Slide bearing according to claim 1, wherein the lubrication groove consists of a main groove and of a transition groove, the transition groove forming the flat ending at the inlet edge.

18. Slide bearing according to claim 17, wherein the transition groove and the main groove have a circular cylindrical shape, and wherein a groove tangent to the transition groove in a corner point between the transition groove and the cylinder jacket of the slide bearing groove together with a bore tangent to the cylinder jacket in the corner point encloses an angle β which is smaller than 30°, at least on a gear wheel side.

19. Slide bearing according to claim 18, wherein said angle β is smaller than 15°.

20. Slide bearing according to claim 19, wherein the angle β decreases along the bearing width from the gear wheel side to the seal side.

21. Slide bearing according to claim 18, wherein the angle β decreases along the bearing width from the gear wheel side to the seal side.

22. Slide bearing according to claim 21, wherein the cross-sectional area of the lubrication groove decreases constantly from the gear wheel side to the seal side.

23. Slide bearing according to claim 1, wherein said gear pump is configured to convey fluids flowing at a high viscosity such as cellulose containing fluids.

24. A gear pump including a slide bearing having a slide bearing jacket and a lubrication groove in said jacket, said lubricating groove extending from a gear pump wheel side toward a gear pump seal side with a lubricating groove axis extending at an angle α with respect to a slide bearing jacket axis, wherein the cross-sectional area of the lubrication groove decreases in a direction from the gear wheel side to the gear pump seal side, and wherein the lubrication groove has a flat ending in an area of an edge which acts as an inlet edge into a slot between the slide bearing and the shaft with respect to the shaft rotating direction.

25. A gear pump according to claim 24, wherein the lubrication groove is provided essentially on a no-load side of the slide bearing.

26. A gear pump according to claim 25, wherein the lubrication groove leads from the gear wheel side to the seal side.

27. A gear pump according to claim 26, wherein the lubrication groove consists of a main groove and of a transition groove, the transition groove forming the flatly constructed area at the inlet edge.

28. A gear pump according to claim 27, wherein the transition groove and the main groove have a circular cylindrical shape, and wherein a groove tangent to the transition groove in a corner point between the transition groove and the cylinder jacket of the slide bearing groove together with a bore tangent to the cylinder jacket in the corner point encloses an angle β which is smaller than 30°, at least on the gear wheel side.

29. Slide bearing for a gear pump having a slide bearing jacket and a lubrication groove in said jacket which extends from an inlet end at a pump gear wheel side to a pump seal side, wherein the lubrication groove is provided essentially on a no-load side of the slide bearing, and wherein the lubrication groove has a larger cross-sectional surface on a gear wheel side than on a seal side.

30. Slide bearing according to claim 29, wherein the lubrication groove on the gear wheel side, viewed in the rotating direction, starts earlier than on the seal side.

31. Slide bearing according to claim 30, wherein the cross-sectional area of the lubrication groove decreases constantly from the gear wheel side to the seal side.

32. Slide bearing according to claim 29, wherein the cross-sectional area of the lubrication groove decreases constantly from the gear wheel side to the seal side.

* * * * *